United States Patent Office 3,636,028
Patented Jan. 18, 1972

3,636,028
CATALYTIC CARBONYLATION OF NITRO
COMPOUNDS TO PREPARE ISOCYANATES
Eric Smith, Madison, Conn., assignor to
Olin Corporation
No Drawing. Filed Mar. 1, 1968, Ser. No. 709,814
Int. Cl. B01j 11/78; C07c 119/04
U.S. Cl. 260—453 PC                                    11 Claims

ABSTRACT OF THE DISCLOSURE

The process for preparing an organic isocyanate by reacting an organic nitro compound with carbon monoxide in the presence of a catalyst system comprised of a mixture of an oxygen-containing heteroaromatic compound and a halide of a noble metal. The heteroaromatic oxygen-containing compound is one (a) containing at least five members in the ring,
(b) containing at least two double bonds in the ring,
(c) containing at least one oxygen in the ring, and
(d) may contain, in addition to oxygen and carbon in the ring, at least one nitrogen atom in the ring.

Dibenzofuran, 2,5-diphenyl furan, and 2,5-diphenyl oxazole are the preferred heteroaromatic oxygen compounds. The noble metal halide is preferably a halide of palladium, rhodium, iridium, platinum, or mixtures thereof. The catalyst system may also include a third component such as molybdenum trioxide or another metal oxide.

---

This invention relates to catalytic systems useful in the preparation of organic isocyanates from organic nitro compounds.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because not more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgian Pat. No. 672,405 entitled "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and elevated temperature in the presence of a catalyst system comprised of a mixture of (I) At least one heteroaromatic compound selected from the group consisting of
  (A) a heteroaromatic oxygen compound containing
    (1) at least five members in the ring,
    (2) at least two double bonds in the ring,
    (3) at least one oxygen in the ring, and
    (4) may contain, in addition to oxygen and carbon in the ring, at least one nitrogen atom in the ring,
  (B) derivatives of I(A), and
(II) At least one halide of a noble metal.

Certain metallic compounds promote the effectiveness of the catalyst system, include oxides of metals of Groups V–B and VI–B of the Periodic Table.

Any organic nitro compound capable of being converted to an organic isocyanate may be employed as a reactant. Generally, aromatic, cycloaliphatic and aliphatic mono- or polynitro compounds, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds
  (a) Nitrobenzene
  (b) Nitronaphthalenes
  (c) Nitroanthracenes
  (d) Nitrobiphenyls
  (e) Bis(nitrophenyl)methanes
  (f) Bis(nitrophenyl)ethers
  (g) Bis(nitrophenyl)thioether
  (h) Bis(nitrophenyl)sulfones
  (i) Nitrodiphenoxy alkanes
  (j) Nitrophenothiazines (II) Nitrocycloalkanes
  (a) Nitrocyclobutane
  (b) Nitrocyclopentane
  (c) Nitrocyclohexane
  (d) Dinitrocyclohexanes
  (e) Bis(nitrocyclohexyl)methanes (III) Nitroalkanes
  (a) Nitromethane
  (b) Nitroethane
  (c) Nitropropane
  (d) Nitrobutanes
  (e) Nitrohexanes
  (f) Nitrooctanes
  (g) Nitrooctadecanes
  (h) Dinitroethane
  (i) Dinitropropanes
  (j) Dinitrobutanes
  (k) Dinitrohexanes
  (l) Dinitrodecanes
  (m) Phenyl nitromethane
  (n) Bromophenyl nitromethanes (o) Nitrophenyl nitromethanes
(p) Methoxy phenyl nitromethanes
(q) Bis-(nitromethyl)cyclohexanes
(r) Bis-(nitromethyl)benzenes All of the aforementioned compound may be substituted with one or more additional substitutents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) Alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) Alpha-chloro-m-nitrotoluene
(36) 1,2,4-trichloro-5-nitrobenzene
(37) 1-bromo-4-nitrobenzene
(28) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis (nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those organic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy) alkylenes and bis(nitrophenoxy)alkyl ethers. Generally, the organic nitro compounds and substituted organic nitro compounds contain between 1 and about 20 carbon atoms, and preferably between about 6 and about 14 carbon atoms.

The catalyst system of this invention is a mixture of at least one heteroaromatic oxygen compound or derivative thereof with at least one noble metal halide. The heteroaromatic ring of these oxygen compounds is one containing at least five members in the heteroaromatic ring, preferably 5 or 6 members, but can contain 7 or more. The ring contains at least two double bonds, and can contain 3 or more. At least one oxygen atom is included in the ring, but 2 or more can be included. If desired, the ring may also contain, in addition to carbon and oxygen atoms, at least one nitrogen atom. The term, "heteroaromatic oxygen compound," as used throughout the description and claims, is intended to include compounds of this type. Derivatives of the heteroaromatic oxygen compounds can also be utilized. The term "derivatives" when used in conjunction with the heteroaromatic oxygen compounds throughout the description and claims is intended to include heteroaromatic oxygen compounds of the type described above having additions to the parent compound such as substituents on the ring, or polycyclic analogues of the oxygen compounds, or polycyclic analogues having substituents on the ring. Derivatives are of the following type:

(I) Substituents on the ring
 (a) halides such as chlorine, bromine, iodine and fluorine
 (b) alkyl containing between 1 and 40 carbon atoms
 (c) aryl such as phenyl, cresyl and xylyl
 (d) olefinic such as allyl and vinyl
 (e) haloalkyl
 (f) haloaryl
 (g) cyano (h) oximino
(i) aldehyde
(j) ethers such as aryl, alkyl and alkenyl ethers
(k) thioethers such as aryl, alkyl and alkenyl ethers
(l) acyl or aroyl
(m) carboxy
(n) carbalkoxy
(o) carbamyl
(p) carboaryloxy
(q) thiocarbamyl
(r) keto (II) Polycyclic Analogues
  (a) fused benzene
  (b) fused cycloaliphatic
  (c) fused nitrogen-containing heteroaromatic
  (d) fused oxygen-containing heteroaromatic (III) Mixtures of two or more additions of Types I–II Typical heteroaromatic oxygen compounds and derivatives thereof which are suitable for use as components of the novel catalyst system of this invention are disclosed in The Ring Index, by Patterson and Capell, Second Edition, American Chemical Society, 1960, and Supplements I, II, and III, and are illustrated by the following compounds:

(1) Five membered ring containing one oxygen, and derivatives thereof
  (a) furan
  (b) 2,5-diphenyl furan
  (c) 2-acetyl furan
  (d) 2-bromo furan
  (e) 3-chloro furan
  (f) 2(bromomethyl)furan
  (g) 2-tert-butyl furan
  (h) 2,5-dichloro furan
  (i) 2-ethoxy furan
  (j) 2-isopropoxy furan
  (k) 2,5-dinitro furan
  (l) 2,3,5-trichloro furan (2) Five membered ring containing one oxygen and at least one nitrogen, and derivatives thereof
  (a) 2,5-diphenyl oxazole
  (b) isoxazole
  (c) furazan
  (d) oxazole
  (e) 1,2,3-oxadiazole
  (f) 1,2,4-oxadiazole
  (g) 1,2,5-oxadiazole
  (h) 1,3,4-oxadiazole
  (i) 1,2,3,4-oxadiazole
  (j) 1,2,3,5-oxatriazole
  (k) indoxazine
  (l) 2,4,5-triphenyl oxazole
  (m) anthranil (3) Polycyclic analogues of five membered ring containing at least one oxygen with or without nitrogen in the ring
  (a) benzoxazole
  (b) benzofuran
  (c) dibenzofuran
  (d) 1H-pyrazolo[4,3-d]oxazole
  (e) furo[3,4-c]cinnoline
  (f) furo[3,4-d]isoxazole
  (g) isobenzofuran
  (h) 1,3-diphenyl isobenzofuran
  (i) furo[3,4-d]oxazole
  (j) 4H-cyclopentoxazole
  (k) 4H-cyclopent[d]isoxazole
  (l) 1H-furo[3,2-d]pyrazole
  (m) furo[2,3-d]-1,3-dioxole
  (n) 2H-furo[2,3-b]pyrrole
  (o) 1H-furo[3,4-b]pyrrole
  (p) furo[3,2-b]furan
  (q) furo[2,3-b]furan
  (r) 4H-cyclopenta[b]furan
  (s) 1,2-benzisoxazole
  (t) 2,1-benziosoxazole (4) Six membered rings containing oxygen and carbon, and derivatives thereof
  (a) α-pyran-1,6-dicarboxylic acid
  (b) 2,4,4,6-tetraphenyl-α-pyran
  (c) 1,2-dioxin
  (d) 1,4-dioxin
  (e) tetraphenyl dioxin
  (f) α-pyrone
  (g) γ-pyrone
  (h) γ-pyrone hydrochloride (5) Six membered ring containing oxygen, carbon, and at least one nitrogen, and derivatives thereof
  (a) 1,2,3,6-dioxadiazine
  (b) 1,4,2,5-dioxadiazine
  (c) 2H-1,2,3,5-oxatriazine
  (d) 2H-1,2,3,6-oxatriazine
  (e) 4H-1,2,4,5-oxatriazine
  (f) 1,2,4-oxazine
  (g) 1,3,2-oxazine
  (h) 1,3,6-oxazine
  (i) isoxazine
  (j) p-isoxazine
  (k) 1,4,2-oxadiazine
  (l) 1,3,5,2-oxadiazine
  (m) 1,3,2-benzoxazine
  (n) 1,4,2-benzoxazine
  (o) 2,3,1-benzoxazine
  (p) 3,1,4-benzoxazine
  (q) 1,2-benzisoxazine
  (r) 1,4-benzisoxazine (6) Polycyclic analogues of six membered rings containing oxygen and carbon, with or without nitrogen in the ring, and derivatives thereof
  (a) chromene
  (b) 2-phenyl chromene (flavene)
  (c) xathene
  (d) phenoxazine (dibenzo-1,4-oxazine)
  (e) 5H-pyrido[2,3-d][1,2]oxazine
  (f) cyclopenta[b]pyran
  (g) pyrano[3,4-b]pyrrole
  (h) 1,2-benzopyran
  (i) xathone
  (j) benzo-α-pyrane
  (k) benzo-γ-pyrone
  (l) benzo-dioxin
  (m) dibenzodioxin
  (n) difuranodioxin
  (o) didioxino dioxin
  (p) 4H-naphtho[1,2-d]-m-dioxin
  (q) 2H-pyrano[3,4-e]-v-tetrazine
  (r) 4aH-2,1,3-benzoxadiazine (7) Seven membered rings containing oxygen and carbon with or without nitrogen, and derivatives thereof
  (a) 5H-1,2,3,7-dioxadiazepine
  (b) 1,2,5,6-oxatriazipine
  (c) 1,3,4,6-oxatriazipine
  (d) 1,3,5-dioxazepine
  (e) 1,2,5-oxadiazepine
  (f) 1,3,4-oxadiazepine
  (g) 1,3,6-oxadiazepine
  (h) 1,2-oxazepine
  (i) 1,3-oxazepine
  (j) 1,4-oxazepine
  (k) 1,3-dioxepin
  (l) 5H-1,4-dioxepin
  (m) oxepin In addition, salts such as benzopyrilium salts, 2,4,6-trimethyl pyrilium perchlorate, 2,4,6-triphenyl pyrilium chloride, and complexes such as the boron trifluoride complexes of heteroaromatic oxygen compounds may also be employed.

The second component of the catalyst system is at least one metal halide of a noble metal. Noble metals include ruthenium, rhodium, palladium, osmium, iridium rhenium, platinum, silver and gold. It is preferred that the metal be one of the platinum series, including a metal halide selected from the group consisting of halides of palladium, rhodium, platinum, iridium and mixtures thereof. Typical examples of suitable halides include palladous dibromide, palladous dichloride, palladous difluoride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, iridium tribromide, iridium tetrabromide, iridium triiodide, iridium tetraiodide, and mixtures thereof. Oxides of the noble metals may also be employed. The terms "halide of a noble metal" and "noble metal halide" as used throughout the description and claims are intended to include the above-mentioned noble metal halides as well as the corresponding oxides, such as palladium oxide, rhodium oxide, platinum oxide, and the like.

The heteroaromatic oxygen compound and the metal halide may each be added separately to the organic nitro compound. The term "mixture," when it relates to the combination of heteroaromatic oxygen compound and metal halide throughout the description and claims is intended to include mixtures of the two components in heterogenous or homogenous form, as well as in the form of coordination complexes, when such complexes are obtainable.

Although all of the aforesaid catalyst systems have some effect on improving the yield of isocyanate, certain systems are significantly more effective than others. Included in these more effective systems are mixtures of the metal halides with the following heteroaromatic oxygen compounds:

(1) diphenyl oxazole
(2) diphenyl furan
(3) dibenzo furan

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio of the heteroaromatic oxygen compound to the anion of the noble metal halide is generally between about 0.1:1 and about 10:1, and preferably between about 0.5:1 and about 1.5:1, but greater or lesser ratios may be employed if desired.

The process of this invention operates effectively in the absence of a solvent, but improved overall yields of the organic isocyanates can be obtained when a solvent which is chemically inert to the components of the reaction system is employed. Suitable solvents include aliphatic cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I) $\quad R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction may be much lower, i.e., substantially instantaneous, and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, and the like, may be employed to separate the organic isocyanate from the unreacted organic nitro compound and any byproducts that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains a mixture or complex of the aforesaid heteroaromatic oxygen-containing compound and metal halide, but also contains a third component comprised of certain metal oxides. Oxides suitable as a third component of the catalyst system include at least one oxide of an element selected from the group consisting of vanadium, molybdenum, tungsten, niobium, chromium and tantalum, as described in co-pending application Ser. No. 619,158, filed Feb. 28, 1967, for Process, by Wilhelm J. Schnabel, Ehrenfried H. Kober and Theodore C. Kraus. These elements are found in Groups V–B and VI–B of the Periodic Table. Suitable oxides of this type include chromic oxide ($Cr_2O_3$), chromium dioxide ($CrO_2$), and chromous oxide (CRO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$) and tantalum pentoxide ($Ta_2O_5$); tungstic oxide ($WO_2$), and tungstic trioxide ($WO_3$); vanadium dioxide ($V_2O_3$), vanadium trioxide ($V_2O_2$), vanadium tetraoxide ($V_2O_4$), vanadium pentoxide ($V_2O_5$). Mixtures of two or more of these oxides may be employed as one component of the catalyst mixture. The proportion of the third component of the catalyst system, when one is employed, is generally equivalent to a weight ratio of the Group VIII metal compound to the metal oxide in the catalyst system generally in the range between about 0.0001:1 and about 25:1, and preferably in the range between about 0.005:1 and about 5:1.

The following examples are presented to describe the invention more fully without any intention of being limited thereby. All parts and percentages are by weight unless otherwise specified.

EXAMPLES 1–3

In these examples, the procedure included charging 2,4-dinitrotoluene (5.0 grams) and the catalyst mixture identified in the table was added to a clean, 100 ml. stainless steel autoclave (316 grade) together with orthodichlorobenzene solvent (5 ml.). The proportion of noble metal chloride was 8% by weight of the dinitrotoluene and the molar ratio of heteroaromatic oxygen compound to noble metal compound was 3:1 unless indicated otherwise.

The autoclave was sealed after being so charged, then pressured with nitrogen and tested for leaks. Nitrogen was released and the autoclave was pressured with carbon monoxide to about 2500 p.s.i.g. During the reaction the autoclave was rocked in a rocker (36 cycles per minute), and heated during one hour to 190° C., when the internal pressure rose to about 3800 p.s.i.g. This temperature was maintained for three hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solutions were combined with the filtrate and the resulting solution was subjected to a determination of its infrared spectrum to test for the presence of isocyanates (which possess a characteristic infrared light absorption at about 4.5 microns). The filtrate was also subjected to analysis by vapor phase chromotography, to determine the weight percentage of 2,4-dinitrotoluene, 2,4-toluene diisocyanate, 2-isocyanate-4-nitrotoluene and 4-isocyanate-2-nitrotoluene present. The conversion of 2,4-dinitrotoluene was calculated. The combined yield of 2,4-toluene diisocyanate and mononitrolyl isocyanates was calculated and then corrected for the amount of 2,4-dinitrotoluene, if any, which had been recovered.

| Example | Catalyst system | Percent conversion | Percent yield of total isocyanate product |
|---|---|---|---|
| 1 a | $RhCl_3$-2,5-diphenylfuran-2 moles | 71 | 31 |
| 2 | $PdCl_2$-dibenzofuran | 3 | 18 |
| 3 | $PdCl_2$-2,5-diphenyl oxazole | 58 | 13 | a Molar ratio of heteroaromatic oxygen compound to noble metal halide=2:1.

For purposes of comparison, a procedure similar to that employed above was employed, except that the catalyst was solely $PdCl_2$. Only a trace of isocyanate could be detected.

Various modifications of the invention, some of which have been referred to above, may be employed without departing from the spirit of the invention.

What is desired to be secured by Letters Patent is:

1. In the process for preparing an aromatic isocyanate by reacting an aromatic nitro compound with carbon monoxide at an elevated temperature and an elevated pressure in the presence of a catalyst, the improvement which comprises employing as said catalyst a catalyst system comprised of a mixture of
   (A) a heteroaromatic oxygen compound selected from the group consisting of
      (1) 2,5-diphenylfuran
      (2) dibenzofuran, and
      (3) diphenyloxazole and
   (B) a halide of a metal selected from the group consisting of
      (1) palladium
      (2) rhodium
      (3) iridium
      (4) platinum
      (5) ruthenium
      (6) rhenium, and
      (7) mixtures thereof, and
   (C) wherein the molar ratio of said heteroaromatic sulfur compound to the anion of said halide is in the range between about 0.1:1 and about 10:1, and
   (D) wherein the proportion of said catalyst system is between about 0.001 and about 500 weight percent of said aromatic nitro compound.

2. The process of claim 1 wherein the molar ratio of heteroaromatic oxygen compound to the anion of said metal halide is in the range between about 0.5:1 and about 1.5:1.

3. The process of claim 2 wherein the proportion of said catalyst system is between about 1 and about 100 weight percent of said aromatic nitro compound.

4. The process of claim 3 wherein said noble metal halide is selected from the group consisting of palladous dichloride, rhodium trichloride, iridium trichloride, rhenium trichloride, platinum tetrachloride and mixtures thereof.

5. The process of claim 4 wherein said aromatic nitro compound is selected from the group consisting of nitrobenzene and dinitrotoluene.

6. The process of claim 5 wherein said metal oxide is selected from the group consisting of chromic oxide ($Cr_2O_3$), chromium dioxide ($CrO_2$), chromous oxide (CrO) molybdenum sesquioxide ($Mo_2O_3$), molybdenum dioxide ($MoO_2$), molybdenum trioxide ($MoO_3$), niobium monoxide (NbO), niobium oxide ($NbO_2$), niobium pentoxide ($Nb_2O_5$), tantalum dioxide ($Ta_2O_2$), tantalum tetraoxide ($Ta_2O_4$), tantalum pentoxide ($Ta_2O_5$), tungstic oxide ($WO_2$), tungstic trioxide ($WO_3$), vanadium dioxide ($V_2O_2$), vanadium trioxide ($V_2O_3$), vanadium tetraoxide ($V_2O_4$), vanadium pentoxide ($V_2O_5$), and mixtures thereof.

7. The process of claim 5 wherein said halide is palladium dichloride.

8. The process of claim 7 wherein said heteroaromatic oxygen compound is 2,5-diphenylfuran.

9. The processes of claim 7 wherein said heteroaromatic oxygen compound is diphenyloxazole.

10. The process of claim 5 wherein said halide is rhodium trichloride.

11. The process of claim 10 wherein said heteroaromatic oxygen compound is 2,5-diphenylfuran.

References Cited

UNITED STATES PATENTS

| 3,461,149 | 8/1969 | Hardy et al. | 260—453 |
| 3,070,618 | 12/1962 | Drummond | 260—453 A |

FOREIGN PATENTS

| 1,025,436 | 4/1966 | Great Britain | 260—453 A |

HENRY R. JILES, Primary Examiner

D. H. TORRENCE, Assistant Examiner

U.S. Cl. X.R.

252—429, 430